US012724735B2

(12) United States Patent
Qian

(10) Patent No.: US 12,724,735 B2
(45) Date of Patent: Sep. 1, 2026

(54) POWER TRANSMISSION SYSTEM AND METHOD FOR UNIVERSAL SERIAL BUS RECEPTACLES

(71) Applicant: Chengli Li, Suzhou (CN)

(72) Inventor: Lei Qian, Suzhou (CN)

(73) Assignee: Chengli Li, Suzhou (CN)

( * ) Notice: Subject to any disclaimer, the term of this patent is extended or adjusted under 35 U.S.C. 154(b) by 113 days.

(21) Appl. No.: 18/530,076

(22) Filed: Dec. 5, 2023

(65) Prior Publication Data

US 2025/0004968 A1 Jan. 2, 2025

(30) Foreign Application Priority Data

Jun. 27, 2023 (CN) ......................... 202310768866.6

(51) Int. Cl.

| | |
|---|---|
| ***G06F 13/40*** | (2006.01) |
| ***G06F 13/42*** | (2006.01) |
| ***H01R 13/66*** | (2006.01) |
| ***H01R 13/70*** | (2006.01) |
| ***H02J 3/36*** | (2026.01) |
| ***H02M 1/088*** | (2006.01) |
| ***H02M 7/217*** | (2006.01) |

(52) U.S. Cl.

CPC ...... *G06F 13/4022* (2013.01); *G06F 13/4068* (2013.01); *G06F 13/4282* (2013.01); *G06F 2213/0042* (2013.01)

(58) Field of Classification Search

CPC ............. G06F 13/4022; G06F 13/4068; G06F 13/4282; G06F 2213/0042; H01R 13/665; H01R 13/70; H02J 3/36; H02M 1/088; H02M 7/217

USPC ........... 710/2, 8, 14, 16, 28, 31, 38, 62, 316

See application file for complete search history.

(56) References Cited

U.S. PATENT DOCUMENTS

| | | | | |
|---|---|---|---|---|
| 7,310,697 | B2 * | 12/2007 | Pandit | G06F 1/266 710/2 |
| 2011/0191503 | A1 * | 8/2011 | Kakish | G06F 13/20 710/305 |
| 2016/0103155 | A1 * | 4/2016 | Mossoba | H02M 1/00 324/117 H |

(Continued)

OTHER PUBLICATIONS

"Teardown of OnePlus SUPERVOOC 100W Dual Ports Charger (VCBAUACH)." ChargerLab. Apr. 3, 2023. URL: https://www.chargerlab.com/teardown-of-oneplus-supervooc-100w-dual-ports-charger-vcbauach/. (Year: 2023).*

*Primary Examiner* — Idriss N Alrobaye
*Assistant Examiner* — Henry W Yu
(74) *Attorney, Agent, or Firm* — Chen Yoshimura LLP

(57) ABSTRACT

A power transmission system and method for a universal serial bus (USB) receptacle includes multiple AC-to-DC conversion modules corresponding one-to-one to multiple USB interfaces; a switch module including a first switch submodule electrically coupled between each AC-to-DC conversion module and its corresponding USB interface, and a second switch submodule electrically coupled between each AC-to-DC conversion module and its non-corresponding USB interface; a control module coupled to the multiple AC-to-DC conversion modules, the multiple USB interfaces, and the switch module, for controlling these components based on device connection information of the multiple USB interfaces, to supply power to the corresponding or non-corresponding USB interfaces.

10 Claims, 8 Drawing Sheets

(56) References Cited

U.S. PATENT DOCUMENTS

| | | | | |
|---|---|---|---|---|
| 2017/0364114 | A1* | 12/2017 | Sporck | G05F 3/08 |
| 2021/0167623 | A1* | 6/2021 | Sanghvi | H02J 7/0024 |
| 2021/0223838 | A1* | 7/2021 | Yeh | G06F 1/266 |
| 2023/0268744 | A1* | 8/2023 | Wang | H02J 7/04<br>307/11 |

* cited by examiner

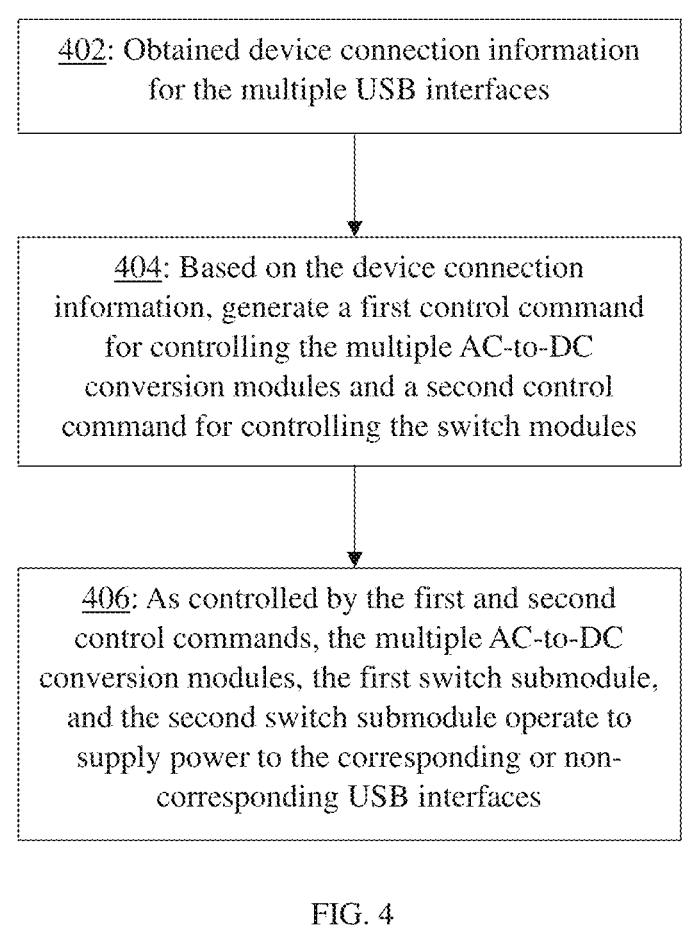

402: Obtained device connection information for the multiple USB interfaces

404: Based on the device connection information, generate a first control command for controlling the multiple AC-to-DC conversion modules and a second control command for controlling the switch modules 406: As controlled by the first and second control commands, the multiple AC-to-DC conversion modules, the first switch submodule, and the second switch submodule operate to supply power to the corresponding or non-corresponding USB interfaces

FIG. 4

POWER TRANSMISSION SYSTEM AND METHOD FOR UNIVERSAL SERIAL BUS RECEPTACLES

BACKGROUND OF THE INVENTION

The present invention relates to the field of Universal Serial Buses (USB) power supply receptacles, and more specifically, to power transmission systems and methods for USB receptacles.

Conventional power transmission solutions for USB receptacles have technical issues such as low output power, low power conversion efficiency, and insufficient charging flexibility.

SUMMARY OF THE INVENTION

To solve at least some of the above issues, embodiments of the present invention provide a power transmission system and method for a USB receptacle.

Accordingly, an embodiment of the present invention provides a power transmission system for a universal serial bus (USB) receptacle, the USB receptacle including a plurality of USB interfaces, the system including: a plurality of AC-to-DC conversion modules, corresponding one-to-one to the plurality of USB interfaces; a switch module, including a first switch submodule electrically coupled between each of the plurality of AC-to-DC conversion modules and the corresponding one of the plurality of USB interfaces, and a second switch submodule electrically coupled between each of the plurality of AC-to-DC conversion modules and non-corresponding ones of the plurality of USB interfaces; and a control module, coupled to the plurality of AC-to-DC conversion modules, the plurality of USB interfaces, and the switch module, configured to control the plurality of AC-to-DC conversion modules, the first switch submodule, and the second switch submodule based on device connection information of the plurality of USB interfaces, to supply power to the corresponding or non-corresponding USB interfaces.

By employing the AC-to-DC conversion modules to directly output variable voltage and current, the number of modules required for the power transmission system of USB receptacle is reduced, thereby reducing production costs, reducing device size (especially suitable for wall receptacles), and improving power conversion efficiency and output voltage range of the system. Moreover, the switch module achieves flexible connection between the AC-to-DC conversion module and the USB interface, so that the output of the multiple AC-to-DC conversion modules can be flexibly controlled based on whether or not given USB interfaces have external devices plugged in to be charged, achieving flexible power supply scheme for multiple USB interfaces. The output power range is increased, significantly improving the charging flexibility of the interfaces.

In some embodiments, the plurality of AC-to-DC conversion modules include a first AC-to-DC conversion unit and a second AC-to-DC conversion unit, the plurality of USB interfaces include a first USB interface and a second USB interface, and the switch module includes a first switch unit, a second switch unit, and a third switch unit, wherein the first switch unit is electrically coupled between the first AC-to-DC conversion unit and the first USB interface, the second switch unit is electrically coupled between the second AC-to-DC conversion unit and the second USB interface, the third switch unit is electrically coupled between the first AC-to-DC conversion unit and the second USB interface, and the third switch unit is electrically coupled between the second AC-to-DC conversion unit and the first USB interface.

In some embodiments, the control module is configured to, in response to external devices being connected to both the first and second USB interfaces to be charged, control the first switch unit and the second switch unit to close and control the third switch unit to open, wherein the first and second AC-to-DC conversion units independently supply power to the first and second USB interfaces, respectively.

In some embodiments, the control module is configured to, in response to an external device being connected the first USB interface to be charged and no external device being connected to the second USB interface, control the first switch unit and the third switch unit to close and control and the second switch unit to open, wherein the first and second AC-to-DC conversion units both supply power to the first USB interface.

In some embodiments, each of the plurality of AC-to-DC conversion modules has an output voltage range of 5-20V.

In some embodiments, the control module includes an IP2738 chip.

In some embodiments, each of the AC-to-DC conversion modules includes a flyback power supply.

In another aspect, the present invention provides a power transmission method for a Universal Serial Bus (USB) receptacle, wherein the USB receptacle includes a plurality of USB interfaces, the method including: obtaining device connection information for the plurality of USB interfaces indicating whether or not each of the plurality of USB interfaces has a device inserted into it to be charged; based on the device connection information, generating a first control command for controlling a plurality of AC-to-DC conversion modules and a second control command for controlling a plurality of switch modules, wherein the plurality of AC-to-DC conversion modules correspond one-to-one to the plurality of USB interfaces, wherein the switch module includes a first switch submodule electrically coupled between each AC-to-DC conversion module and its corresponding USB interface, and a second switch submodule electrically coupled between each AC-to-DC conversion module and its non-corresponding USB interfaces; based on the first control command and the second control command, the plurality of AC-to-DC conversion modules, the first switch submodule, and the second switch submodule operating to supply power to the corresponding USB interfaces or the non-corresponding USB interfaces.

In some embodiments, the plurality of AC-to-DC conversion modules include a first AC-to-DC conversion unit and a second AC-to-DC conversion unit, the plurality of USB interfaces include a first USB interface and a second USB interface, and the switch module includes a first switch unit, a second switch unit, and a third switch unit, wherein the first switch unit is electrically coupled between the first AC-to-DC conversion unit and the first USB interface, the second switch unit is electrically coupled between the second AC-to-DC conversion unit and the second USB interface, the third switch unit is electrically coupled between the first AC-to-DC conversion unit and the second USB interface, and the third switch unit is electrically coupled between the second AC-to-DC conversion unit and the first USB interface, the method including: in response to external devices being connected to both the first and second USB interfaces to be charged, closing the first and second switch units and opening the third switch unit, so that the first and second AC-to-DC conversion units independently supply power to the first and second USB interfaces.

In some embodiments, the method includes: in response to an external device being connected to the first USB interface to be charged and no external device being connected to the second USB interface, closing the first switch unit and the third switch unit and opening the second switch unit, wherein the first and second AC-to-DC conversion units both supply power to the first USB interface.

BRIEF DESCRIPTION OF DRAWINGS

Embodiments of the present invention are described with reference to the following drawings. Other objectives, details, features, and advantages of the embodiments will also become clearer from the detailed descriptions.

FIG. 4 is a flowchart of a power transmission method for a USB receptacle according to an embodiment of the present invention.

DETAILED DESCRIPTION OF THE INVENTION

Embodiments of the present invention are described below with reference to the drawings. In the embodiments, many details are described for a full understanding of the invention. However, those skilled in the relevant art will readily recognize that some of the described features may be omitted in certain situations or replaced by other components, materials or methods. In some situations, certain operational aspects of the embodiments may not be expressly shown or described in this disclosure; for those skilled in the relevant art, such descriptions are not necessary, and the operations mat be readily understood based on the descriptions of the structures and common knowledge in the field.

In this disclosure, ordinal numbers such as first, second, etc. are only used to distinguish the objects being described, and do not connote a temporal or spatial sequence or a particular number of parts. Further, terms such as connect, coupled, link, etc. refer to either direct or indirect connections, unless otherwise indicated.

Figure 1:
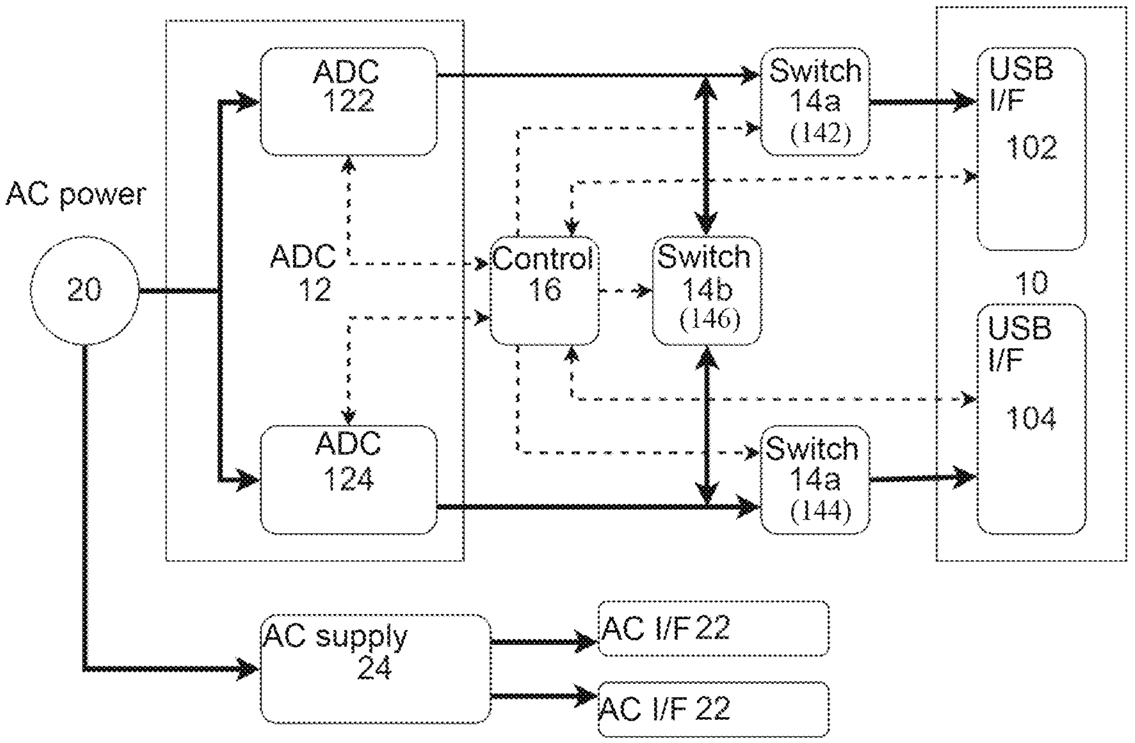
FIG. 1 is a block diagram of a power transmission system for a USB receptacle according to an embodiment of the present invention.

FIG. 1 is a block diagram of a power transmission system for a USB receptacle according to an embodiment of the present invention. The USB receptacle includes multiple USB interfaces 10, and the power transmission system includes multiple AC-to-DC conversion modules 12, switch modules 14, and control modules 16. In this figure, communication connections between the modules are represented by dashed lines, and electrical connections are represented by solid lines. The multiple AC-to-DC conversion modules 12 correspond one-to-one with the multiple USB interfaces 10, and the AC-to-DC conversion module 12 converts the AC power received from the AC power supply 20 into required DC power. The switch module 14 includes a first switch submodule 14*a* and a second switch submodule 14*b*. The first switch submodule 14*a* is electrically coupled between the AC-to-DC conversion module 12 and the corresponding USB interface 10, and the second switch submodule 14*b* is electrically coupled between the AC-to-DC conversion module 12 and the non-corresponding USB interface 10. The control module 16 is communicatively connected to the multiple AC-to-DC conversion modules 12, the multiple USB interfaces 10, and the switch module 14, and configured to control the multiple AC-to-DC conversion modules 12, the first switch submodule 14*a*, and the second switch submodule 14*b* based on device connection information of the multiple USB interfaces 10, in order to supply power to the corresponding or non-corresponding USB interfaces 10. Device connection information of the USB interfaces 10 refers to information that indicates whether or not a given USB interface 10 has an external device inserted into it to be charged. This information may be obtained by the control module 16 by detecting electrical characteristics of one or more pins of the USB interface.

In some embodiments, the USB receptacle also includes an AC receptacle interface 22, which is powered by an AC power supply 20 through an AC power transmission system 24. The power transmission system described herein can work in parallel with the AC power transmission system that supplies power to the AC receptacle interface, without interfering with each other.

In some embodiments, the multiple AC-to-DC conversion modules 12 include a first AC-to-DC conversion unit 122 and a second AC-to-DC conversion unit 124, the multiple USB interfaces 10 include a first USB interface 102 and a second USB interface 104, and the switch module 14 includes a first switch unit 142 (which is also the first switch submodule 14*a*), a second switch unit 144 (which is also the first switch submodule 14*a*), and a third switch unit 146 (which is also the second switch submodule 14*b*). The first conversion unit 122 is electrically connected to the first interface 102 through the first switch unit 142, the second conversion unit 124 is electrically connected to the second interface 104 through the second switch unit 144, the first conversion unit 122 is also electrically connected to the second interface 104 through the third switch unit 146, and the second conversion unit 124 also is electrically connected to the first interface 102 through the third switch unit 146.

In some embodiments, when both the first interface 102 and the second interface 104 have devices inserted into them to be charged, the control module 16 controls the first switch unit 142 and the second switch unit 144 to close and controls the third switch unit 146 to open, so that the first conversion unit 122 and the second conversion unit 124 independently supply power to the first interface 102 and the second interface 104, respectively. In other words, the first conversion unit 122 outputs DC power that conforms to the first interface 102, the second conversion unit 124 outputs DC power that conforms to the second interface 104, and the outputs of the first conversion unit 122 and the second conversion unit 124 do not interfere with each other.

In other embodiments, when the first interface 102 is connected with a device being charge and the second interface 104 is not connected with a device being charged, the control module 16 controls the first switch unit 142 and the third switch unit 146 to close and the second switch unit 144 to open, so that the first conversion unit 122 and the second conversion unit 124 cooperate with each other to supply power to the first interface 102. For example, when the device connected to the first interface 102 requires a DC output of 20V and 3 A, but the second interface 104 is not connected with a device to be charged, the control module 16 may control the first conversion unit 122 and the second conversion unit 124 to each output a DC output of 20V and 1.5 A. For example, when the device connected to the first interface 102 requires a power output of 30 W while the second interface 104 is not connected with a device to be charged, the control module 16 may control the first conversion unit 122 and the second conversion unit 124 to output 10 W and 20 W, respectively, or control the first conversion unit 122 and the second conversion unit 124 to each output 15 W.

Similarly, when the first interface 102 is not connected to a device and the second interface 104 is connected to a device to be charged, the operation of the control module 16 is similar to the that described earlier where the first interface 102 is connected to a device and the second interface 104 is not connected to a device, and detailed descriptions are omitted here.

In some embodiments, the rated output of AC power supply 20 is 120 VAC. In some embodiments, the output voltage range of each of the AC-to-DC conversion module 12 is 5-20V (such as standard voltages 5V, 9V, 12V, 15V, and 20V according to the USB-PD protocol). In some embodiments, control module 16 communicates with the AC-to-DC conversion module 12 through a bidirectional two-wire synchronous serial bus (I2C bus). In some embodiments, the control module 16 uses an IP2738 chip. In some embodiments, the AC-to-DC conversion module 12 uses a flyback power supply. The flyback switching power supply has the advantages of a simple circuit and small size; it is suitable for low-power or multi-channel output situations, and its voltage transformer has the function of energy storage and voltage conversion isolation. It is particularly suitable for wall-mounted receptacles with multiple USB interfaces.

Figure 2A:
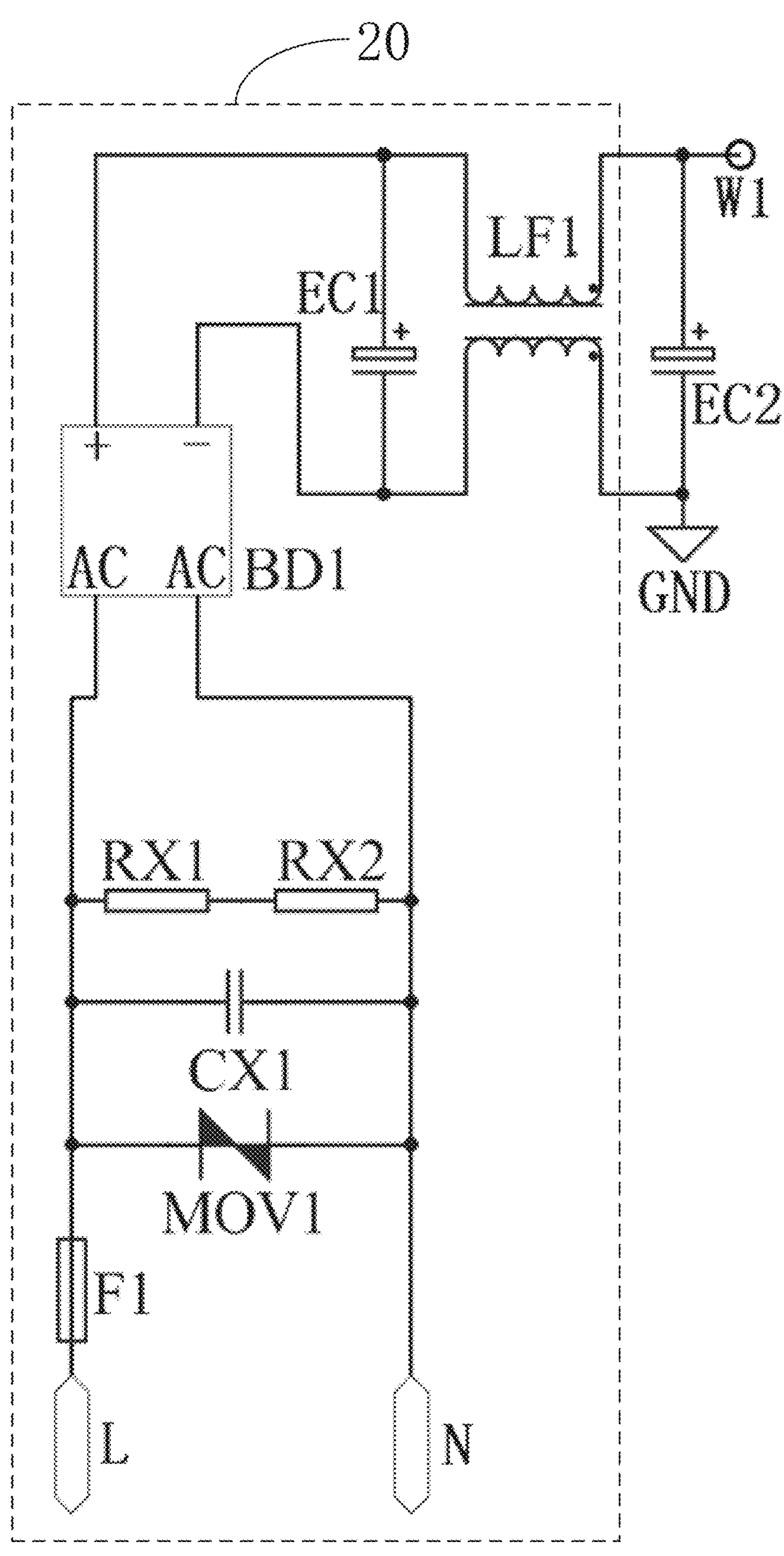
FIGS. 2A-2C and 3A-3C are circuit diagrams of a power transmission system for a USB receptacle according to an embodiment of the present invention.
Figure 2B:
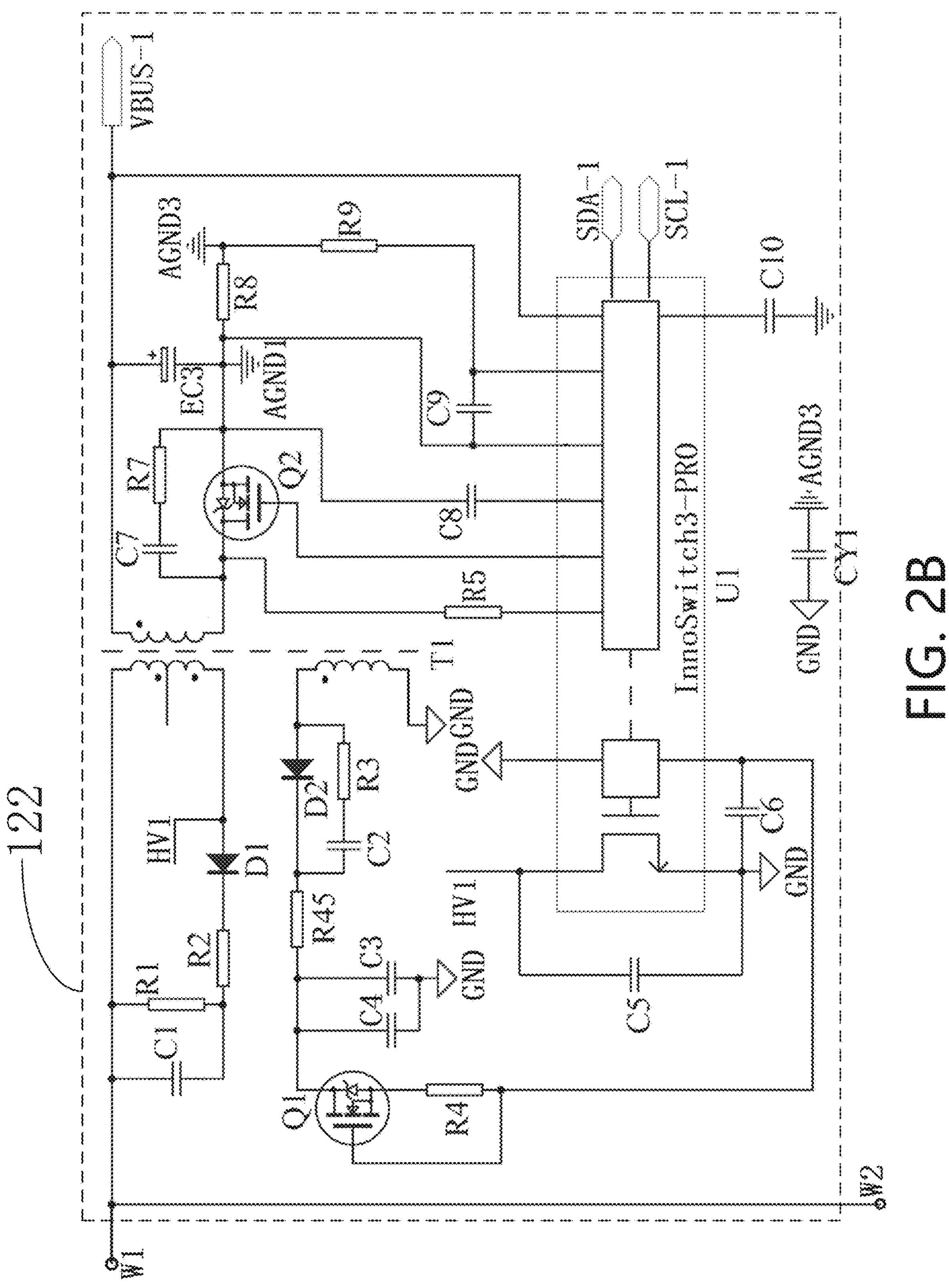
Figure 2C:
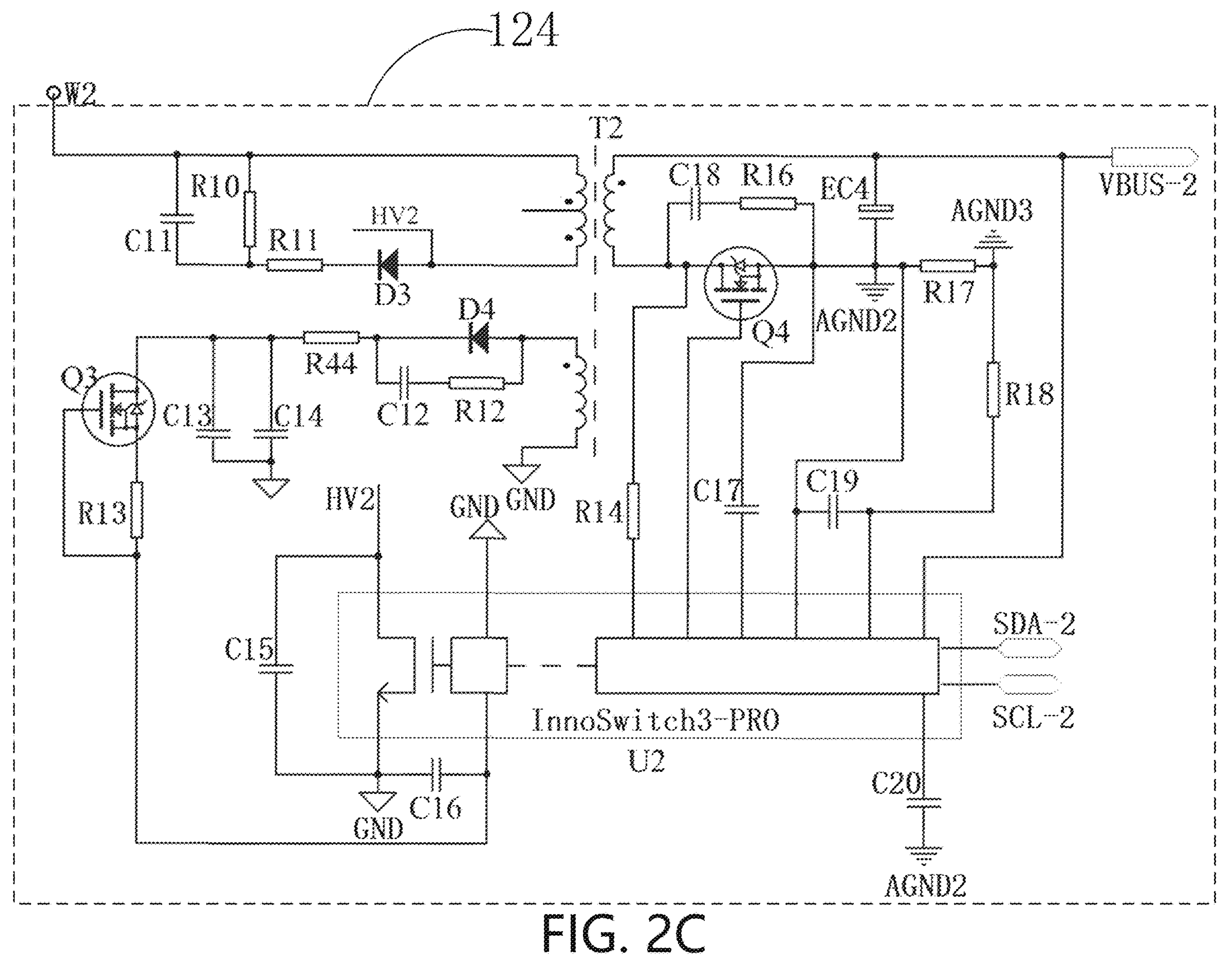
Figure 3A:
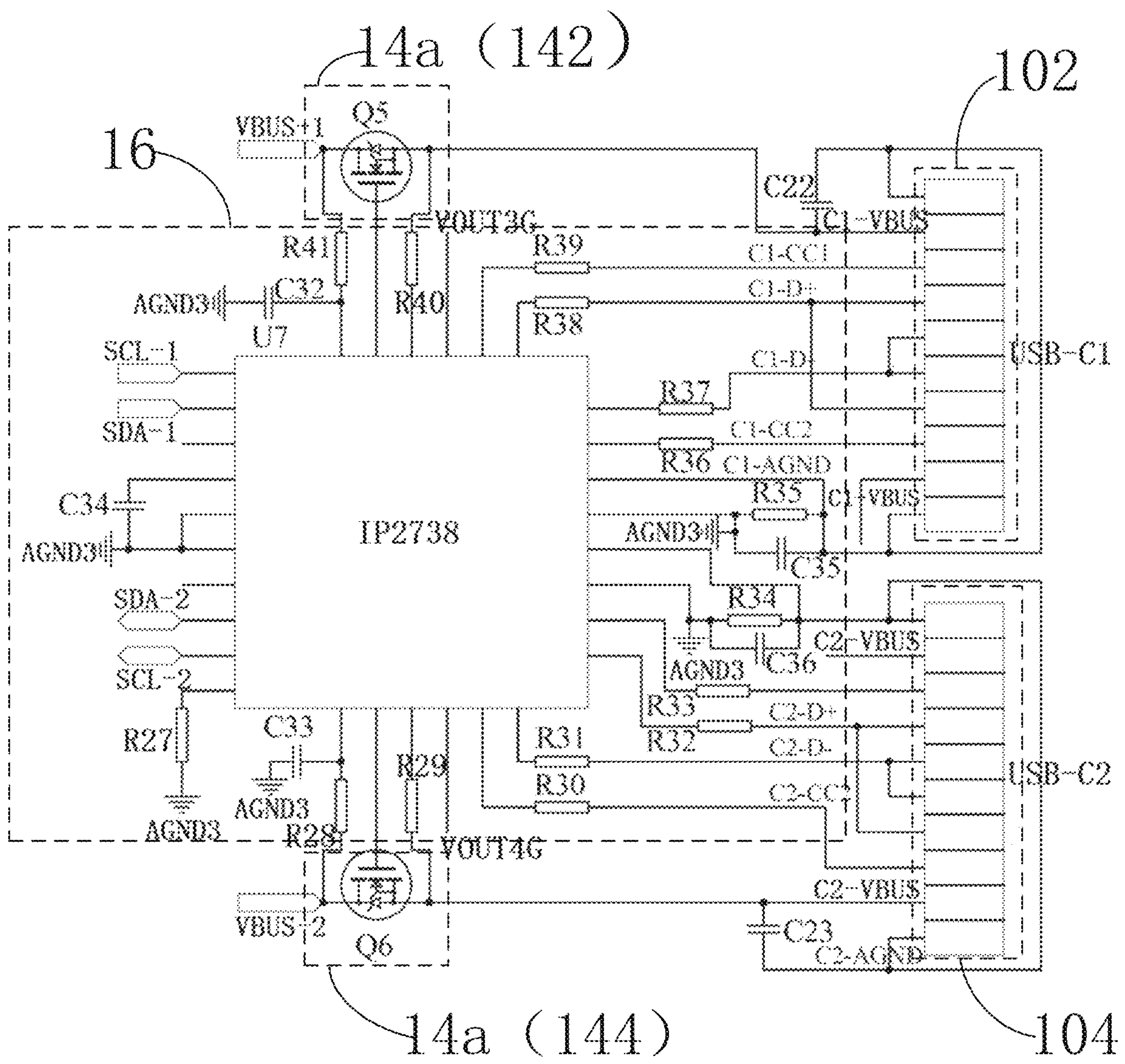
Figure 3B:
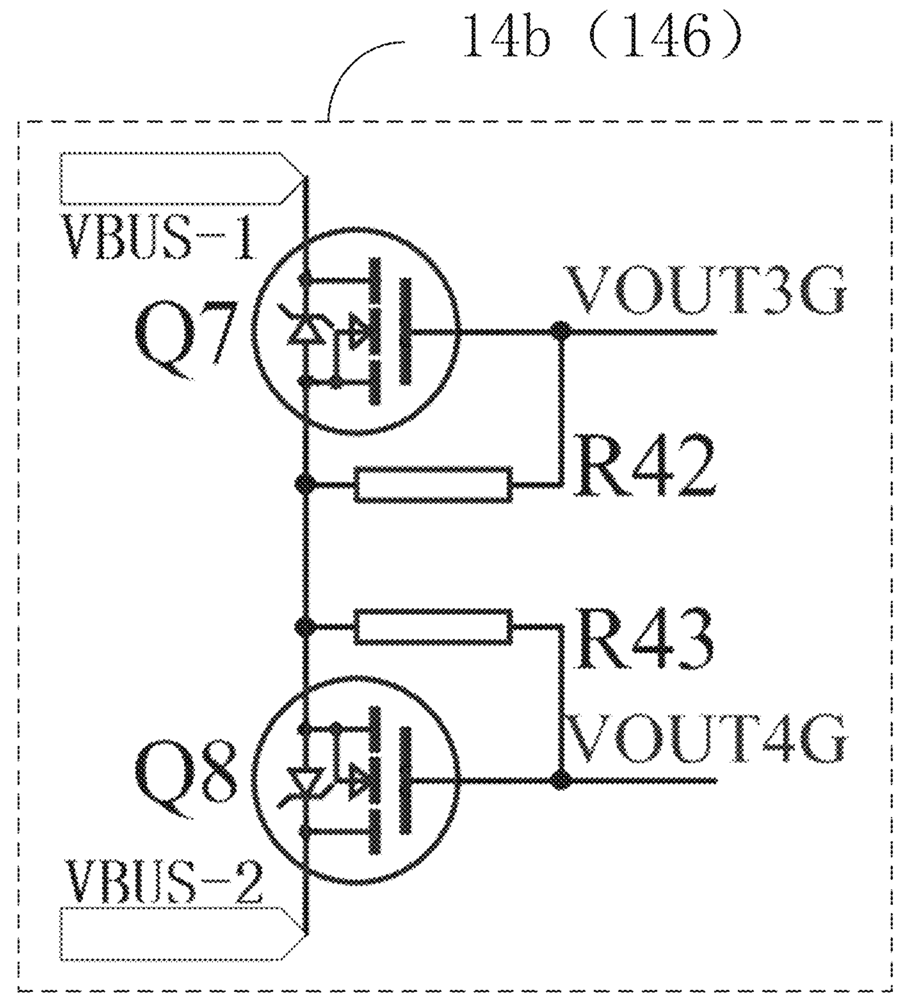

Each of the modules described above is implemented by electrical circuitry formed of suitable electrical components. For example, each switch module or submodule or switch unit may include one or more semiconductor switches; each AC-to-DC conversion module may include a rectifier circuit; the control module may include suitable IC chips, etc. FIGS. 2A-2C and 3A-3B are circuit diagrams of a power transmission system for a USB receptacle according to a particular embodiment of the present invention. FIGS. 2B and 2C show the circuit diagram of the AC-to-DC conversion module 12, FIG. 2A shows the AC power supply 20, and FIGS. 3A and 3B show the circuit diagram of the switch module 14 and the control module 16. FIGS. 2A-2C and 3A-3B use an example that uses two AC-to-DC conversion modules 12 and two USB interfaces 10, but it should be noted that FIGS. 2A-2C and 3A-3B are only illustrative examples, and the invention is not limited to any particular numbers of the various modules.

Specifically, a chip IP2738 in the control module 16 is communicatively connected to the AC-to-DC conversion module 12 through an InnoSwitch3-Pro chip. The InnoSwitch3-Pro chip is a digitally controlled constant voltage/constant current offline flyback quasi resonant switch IC (integrated circuit) that integrates high-voltage switching, synchronous rectification, and FluxLink feedback functions. The IP2738 chip controls the electrical connection between the first conversion unit 122 and the first interface 102 by controlling the on and off of switch Q5, the electrical connection between the second conversion unit 124 and the second interface 104 by controlling the on and off of switch Q6, and the electrical connection between the first conversion unit 122 and the second interface 104 and between the second conversion unit 124 and the first interface 102 by controlling the on and off of switches Q7 and Q8.

Figure 3C:
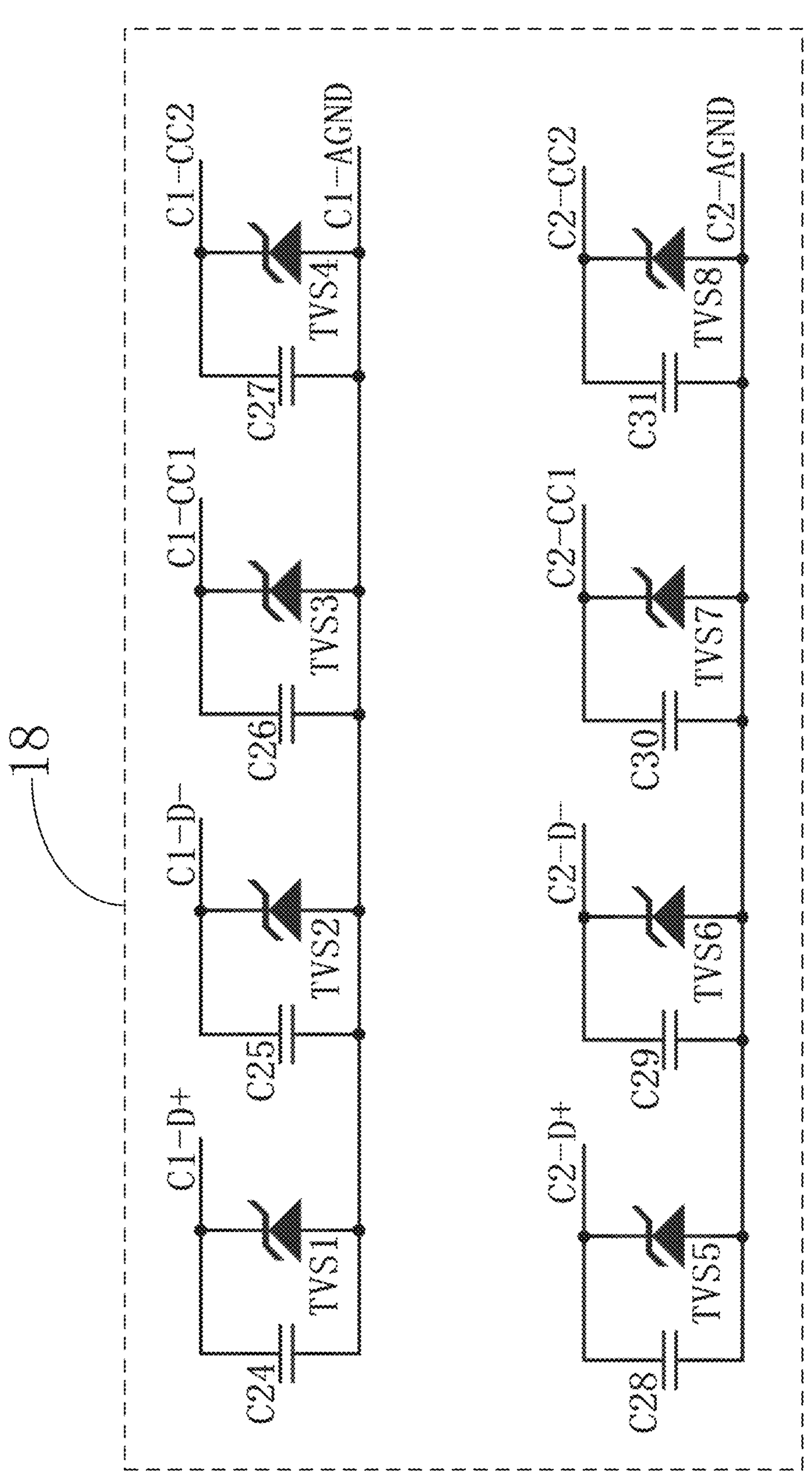

In some embodiments, the power transmission system also includes a protection unit 18 (see FIG. 3C), which uses transient voltage suppressors (TVSs) to protect the USB interface. For example, it protects the C1-D+, C1-D−, C1-CC1, and C1-CC2 ports of the first interface 102 using TVS1, TVS2, TVS3, and TVS4, and protecting the C2-D+, C2-D−, C2-CC1, and C2-CC2 ports of the second interface 104 using TVS5, TVS6, TVS7, and TVS8.

In some embodiments, the third switch unit 146 includes switch Q7, switch Q8, resistor R42, and resistor R43, where the drain (D) of switch Q7 is electrically coupled to the output terminal of the first conversion unit 122, the source (S) of switch Q7 is electrically coupled to the source (S) of switch Q8, and the gate (G) of switch Q7 is electrically coupled to the control terminal VOUT3G of chip IP2738. The drain (D) of switch Q8 is electrically coupled to the output terminal of the second conversion unit 124, and the gate (G) of switch Q8 is electrically coupled to the control terminal VOUT4G of chip IP2738. The switch module 14 can select any controllable switch components to achieve flexible power supply from multiple AC-to-DC conversion modules to multiple USB interfaces. The invention is not limited to any particular type, quantity, or form of the switch components.

FIG. 4 is a flowchart of a power transmission method 40 for a USB receptacle according to an embodiment of the present invention. The USB receptacle includes multiple USB interfaces. The method includes steps S402-S406, described below.

In step S402, device connection information for the multiple USB interfaces is obtained.

In step S404, based on the device connection information, a first control command for controlling the multiple AC-to-DC conversion modules and a second control command for controlling the switch modules are generated. The multiple AC-to-DC conversion modules correspond to the multiple USB interfaces one by one. The switch module includes a first switch submodule electrically coupled between each AC-to-DC conversion module and its corresponding USB interface, and a second switch submodule electrically coupled between each AC-to-DC conversion module and its non-corresponding USB interface.

In step S406, as controlled by the first control command and the second control command, the multiple AC-to-DC conversion modules, the first switch submodule, and the second switch submodule operate to supply power to the corresponding or non-corresponding USB interfaces.

Other aspects of this embodiment are similar to those of the power transmission system for USB receptacles described earlier and will not be repeated here.

Embodiments of the present invention are described above. It will be apparent to those skilled in the art that various modifications may be made without departing from the spirit or scope of the invention. While the operation principles of the various embodiments are described, various structures, arrangements, proportions, devices, materials and components may be modified to adapt to particular environments or application requirements without departing from the spirit or scope of the invention. Such modifications of other modifications are within the scope of the present invention. Thus, the above descriptions do not limit the scope of the invention. While the advantages of various embodiments and the solutions to various technical problems are described, the advantages and solutions and any considerations that lead to these advantages or solutions, or other variations of solutions may not be critical, necessarily or inherent. Terms such as “include” or variations of such terms used in the above disclosure should be interpreted as being non-exclusive. The process, method, article of manufacture or apparatus that includes any listed elements may include not only these elements, but other elements not specifically listed or outside of these process, method, article of manufacture or apparatus. Further, terms such as “couple”

or variations of such terms used in the above disclosure should be interpreted to include physical coupling, electrical coupling, magnetic coupling, optical coupling, communicative coupling, functional coupling and/or any other form of coupling.

It will be apparent to those skilled in the art that various modifications may be made to the above described embodiments without departing from the spirit or scope of the invention. Thus, it is intended that the scope of the invention is defined by the appended claims.

The invention claimed is:

1. A power transmission system for a universal serial bus (USB) receptacle, the USB receptacle including a plurality of USB interfaces, the system comprising:

a plurality of AC-to-DC conversion modules, corresponding one-to-one to the plurality of USB interfaces, each AC-to-DC conversion module including a chip which is a digitally controlled constant voltage and constant current offline flyback quasi resonant switch integrated circuit configured to perform high-voltage switching, synchronous rectification, and FluxLink feedback functions, wherein the chips in the plurality of AC-to-DC conversion modules operate independently of each other;

a switch module, including a first switch submodule electrically coupled between each of the plurality of AC-to-DC conversion modules and the corresponding one of the plurality of USB interfaces, and a second switch submodule electrically coupled between each of the plurality of AC-to-DC conversion modules and non-corresponding ones of the plurality of USB interfaces; and a control module, including a single control chip communicatively coupled to the plurality of AC-to-DC conversion modules, the plurality of USB interfaces, and the switch module, wherein the control chip is configured to continuously obtain device connection information of the plurality of USB interfaces by detecting electrical characteristics of one or more pins of each USB interface, and to control the plurality of AC-to-DC conversion modules, the first switch submodule, and the second switch submodule based solely on the device connection information of the plurality of USB interfaces without regard to outputs of the plurality of AC-to-DC conversion modules, to supply power to the corresponding or non-corresponding USB interfaces.

2. The power transmission system of claim 1, wherein the plurality of AC-to-DC conversion modules include a first AC-to-DC conversion unit and a second AC-to-DC conversion unit, the plurality of USB interfaces include a first USB interface and a second USB interface, and the switch module includes a first switch unit, a second switch unit, and a third switch unit, wherein the first switch unit is electrically coupled between the first AC-to-DC conversion unit and the first USB interface, the second switch unit is electrically coupled between the second AC-to-DC conversion unit and the second USB interface, the third switch unit is electrically coupled between the first AC-to-DC conversion unit and the second USB interface, and the third switch unit is electrically coupled between the second AC-to-DC conversion unit and the first USB interface.

3. The power transmission system of claim 2, wherein the control chip in the control module is configured to, in response to external devices being connected to both the first and second USB interfaces to be charged, control the first switch unit and the second switch unit to close and control the third switch unit to open, wherein the first and second AC-to-DC conversion units independently supply power to the first and second USB interfaces, respectively.

4. The power transmission system of claim 2, wherein the control chip in the control module is configured to, in response to an external device being connected the first USB interface to be charged and no external device being connected to the second USB interface, control the first switch unit and the third switch unit to close and control and the second switch unit to open, wherein the first and second AC-to-DC conversion units both supply power to the first USB interface.

5. The power transmission system of claim 1, wherein each of the plurality of AC-to-DC conversion modules has an output voltage range of 5-20V.

6. The power transmission system of claim 1, wherein the control chip in the control module is an IP2738 chip.

7. The power transmission system of claim 1, wherein each of the AC-to-DC conversion modules includes a flyback power supply.

8. A power transmission method for a Universal Serial Bus (USB) receptacle, wherein the USB receptacle includes a plurality of USB interfaces, the method comprising:

by a single control chip coupled to the plurality of USB interfaces, continuously detecting electrical characteristics of one or more pins of each of the plurality of USB interfaces to obtain device connection information for the plurality of USB interfaces indicating whether or not each of the plurality of USB interfaces has a device inserted into it to be charged;

by the control chip, based solely on the device connection information without regard to any power conversion outputs, generating a first control command for controlling a plurality of AC-to-DC conversion modules and a second control command for controlling a switch module, wherein the plurality of AC-to-DC conversion modules correspond one-to-one to the plurality of USB interfaces, wherein the switch module includes a first switch submodule electrically coupled between each AC-to-DC conversion module and its corresponding USB interface, and a second switch submodule electrically coupled between each AC-to-DC conversion module and its non-corresponding USB interfaces; and based on the first control command and the second control command, the plurality of AC-to-DC conversion modules operate independently of each other to generate a corresponding plurality of DC outputs, and the first switch submodule and the second switch submodule operate to supply the plurality of DC outputs to the corresponding USB interfaces or the non-corresponding USB interfaces.

9. The power transmission method of claim 8, wherein the plurality of AC-to-DC conversion modules include a first AC-to-DC conversion unit and a second AC-to-DC conversion unit, the plurality of USB interfaces include a first USB interface and a second USB interface, and the switch module includes a first switch unit, a second switch unit, and a third switch unit, wherein the first switch unit is electrically coupled between the first AC-to-DC conversion unit and the first USB interface, the second switch unit is electrically coupled between the second AC-to-DC conversion unit and the second USB interface, the third switch unit is electrically coupled between the first AC-to-DC conversion unit and the second USB interface, and the third switch unit is electrically coupled between the second AC-to-DC conversion unit and the first USB interface, the method comprising:

by the control chip, in response to external devices being connected to both the first and second USB interfaces to be charged, closing the first and second switch units and opening the third switch unit, so that the first and second AC-to-DC conversion units independently supply power to the first and second USB interfaces.

10. The power transmission method of claim 9, comprising:

by the control chip, in response to an external device being connected to the first USB interface to be charged and no external device being connected to the second USB interface, closing the first switch unit and the third switch unit and opening the second switch unit, wherein the first and second AC-to-DC conversion units both supply power to the first USB interface.

* * * * *